INVENTOR.
Edward R. Barrett.
BY
Harness, Dickey, Pierce & Hann.
ATTORNEYS.

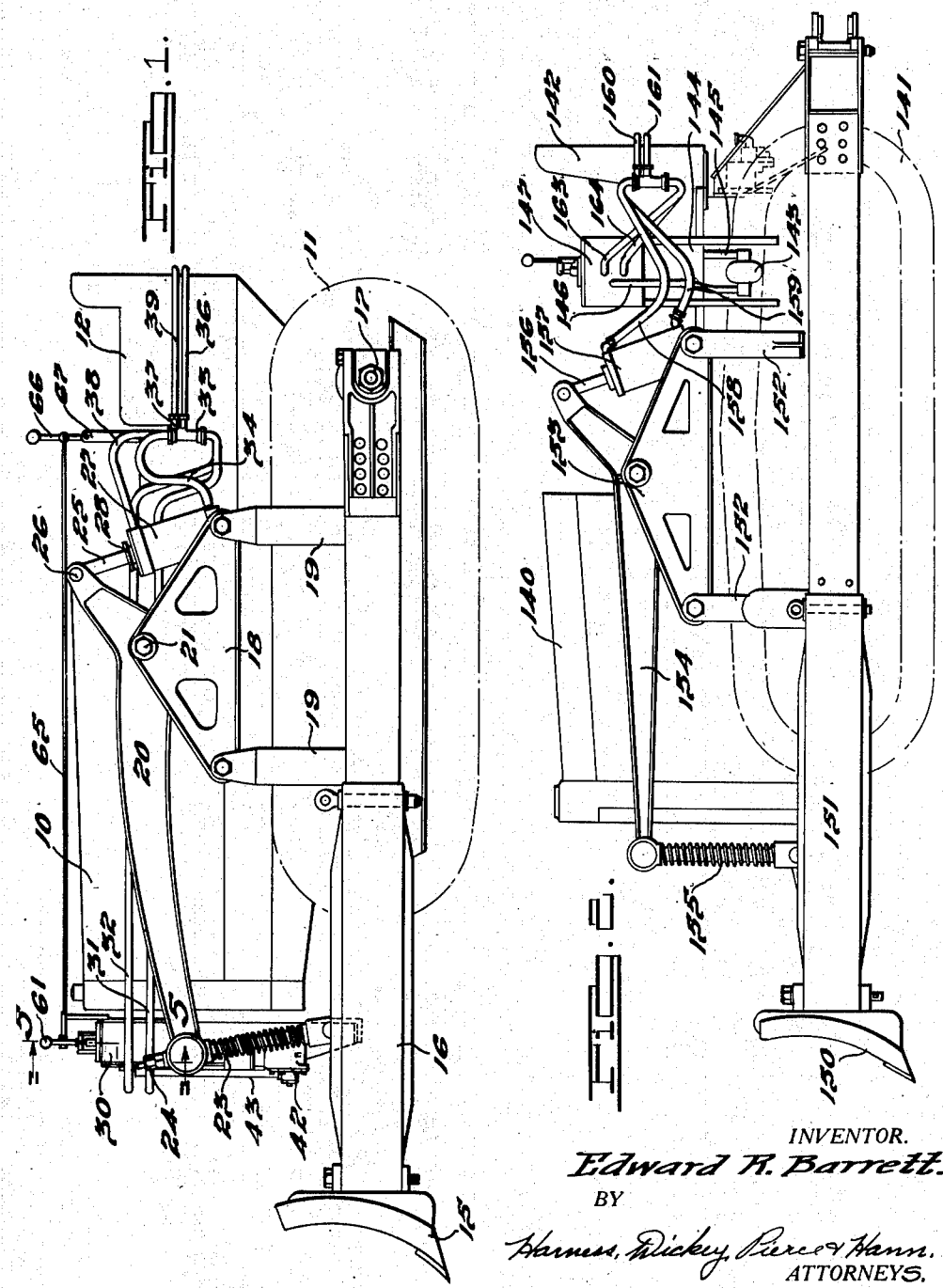

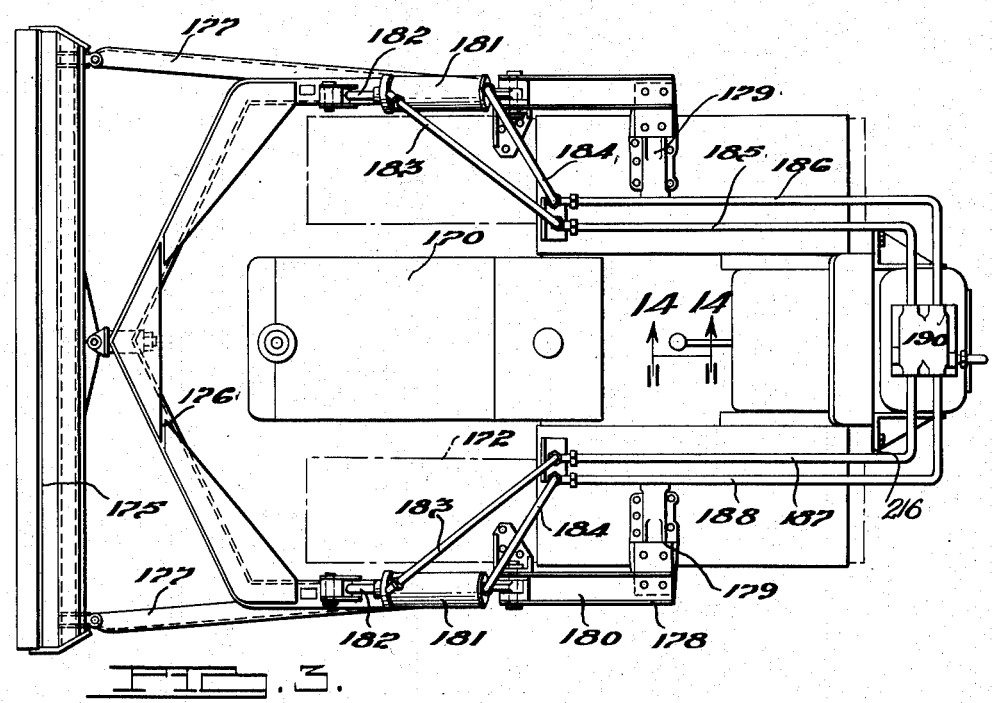
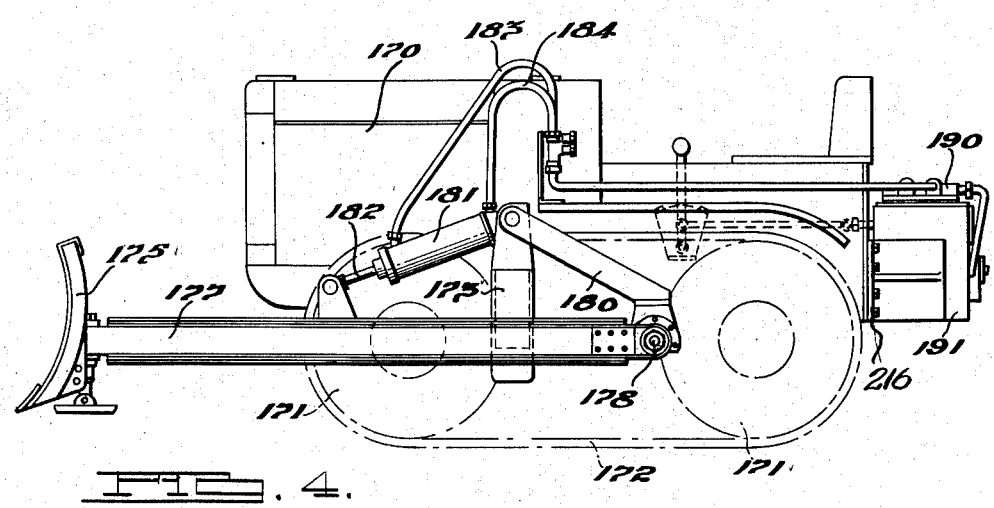

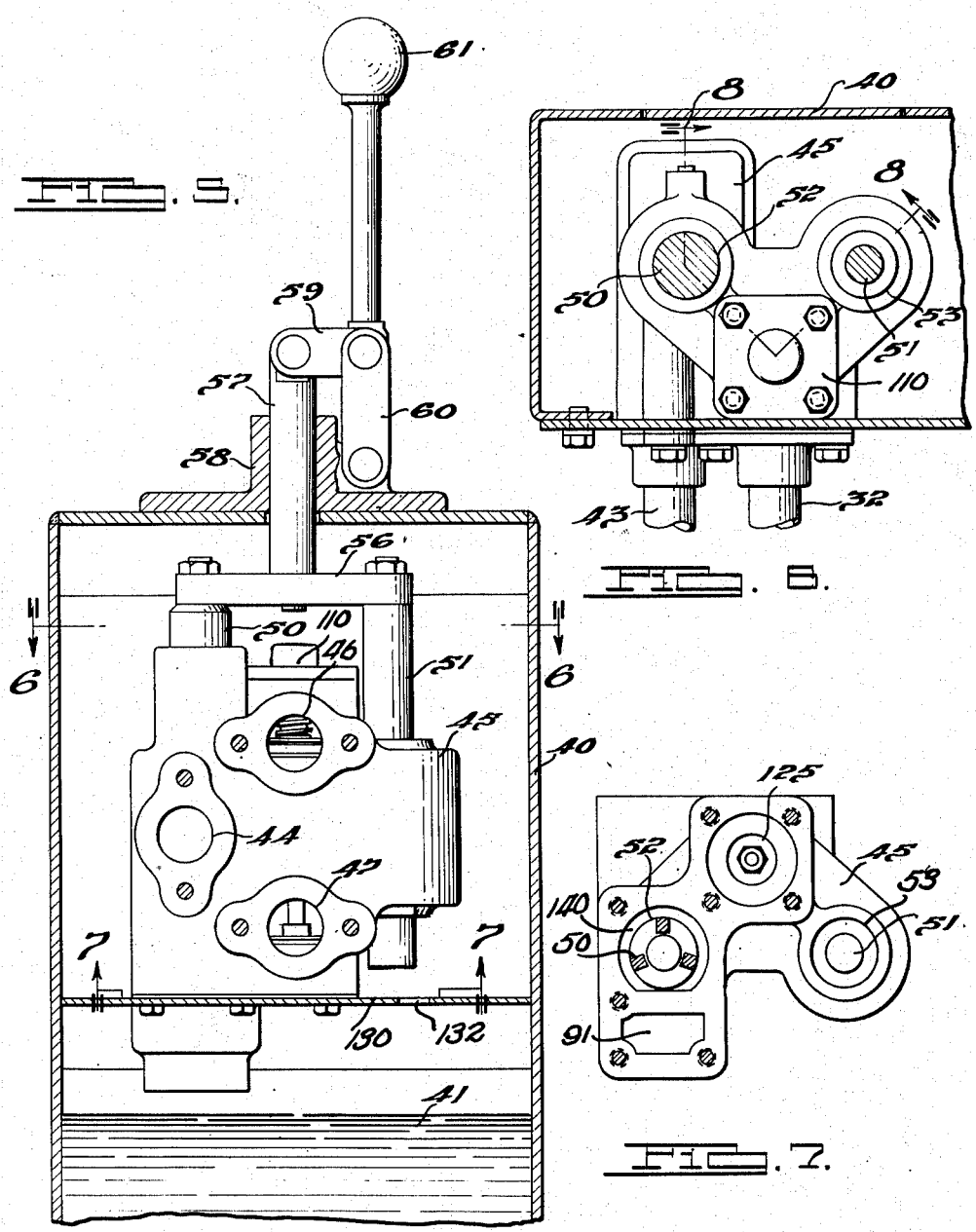

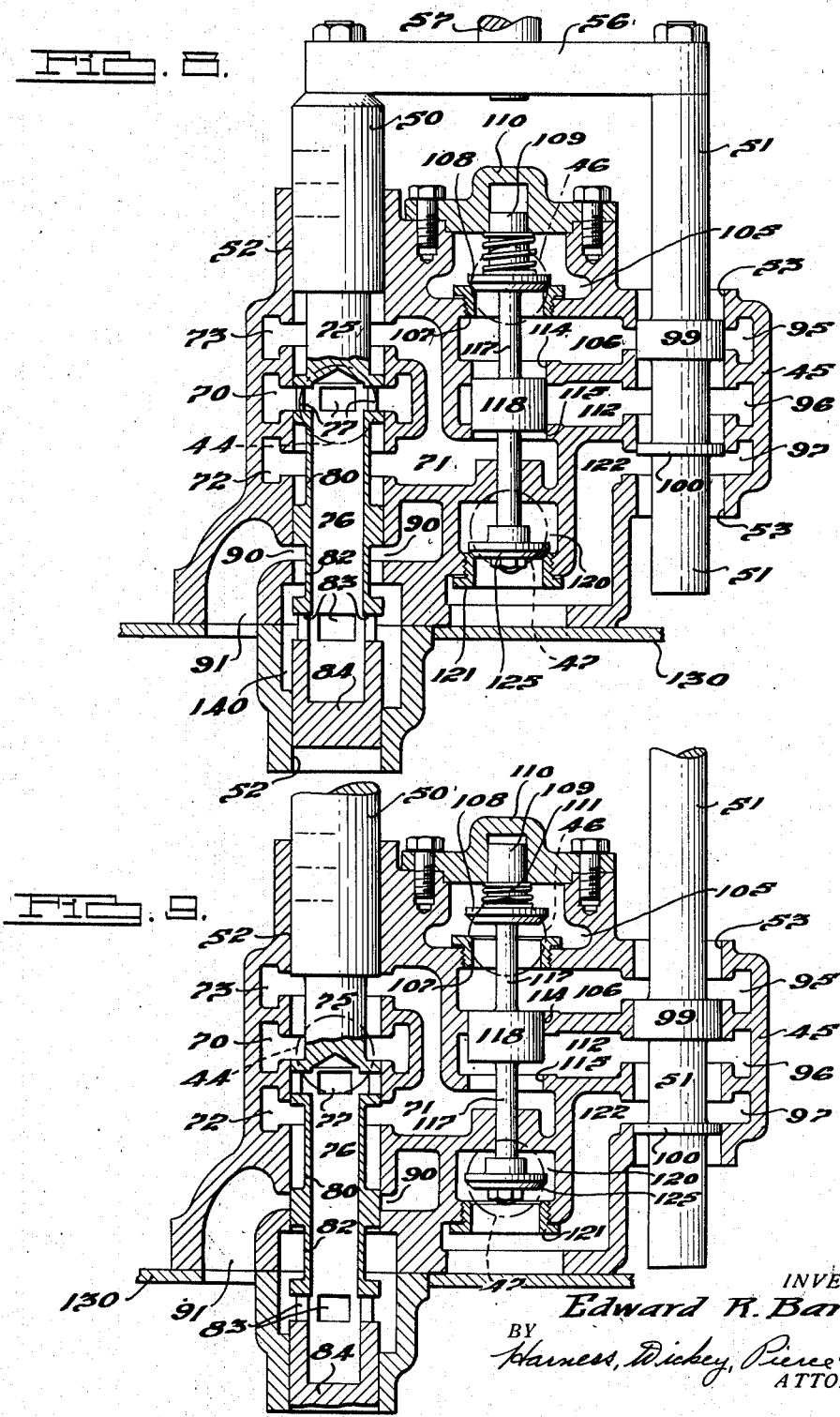

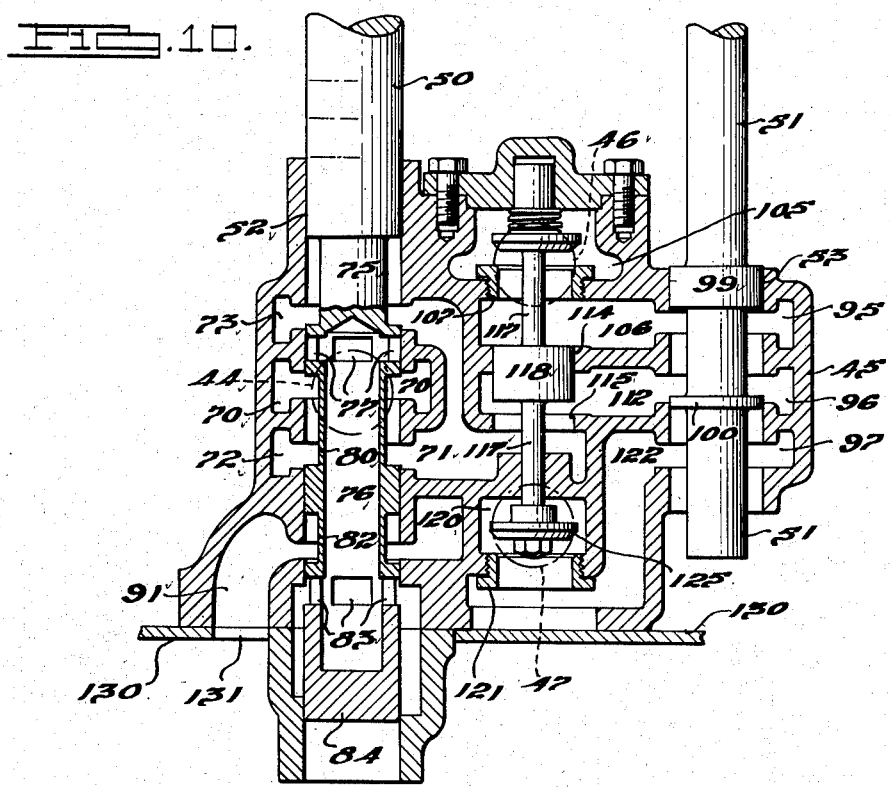
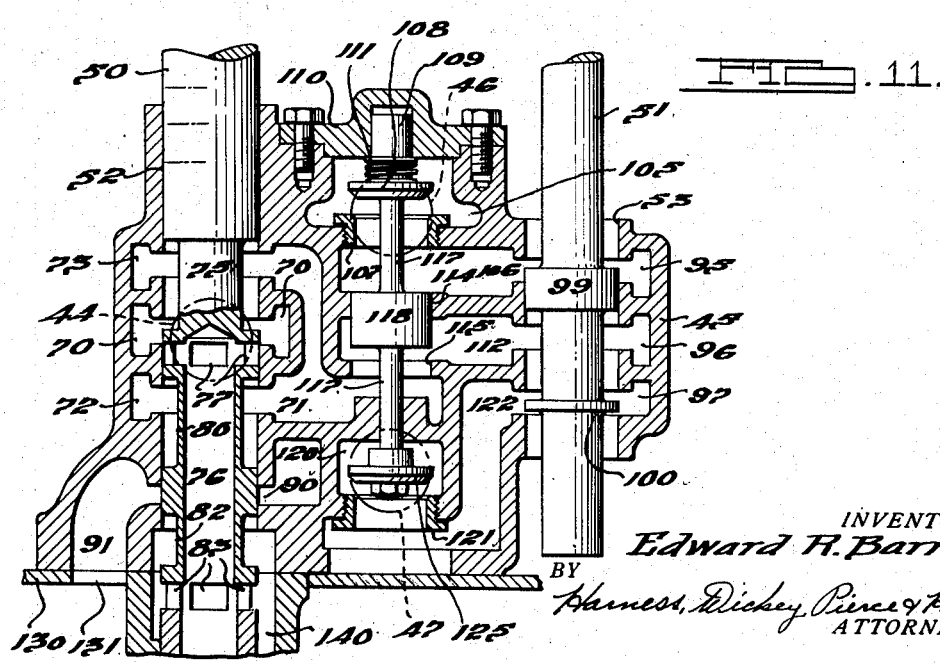

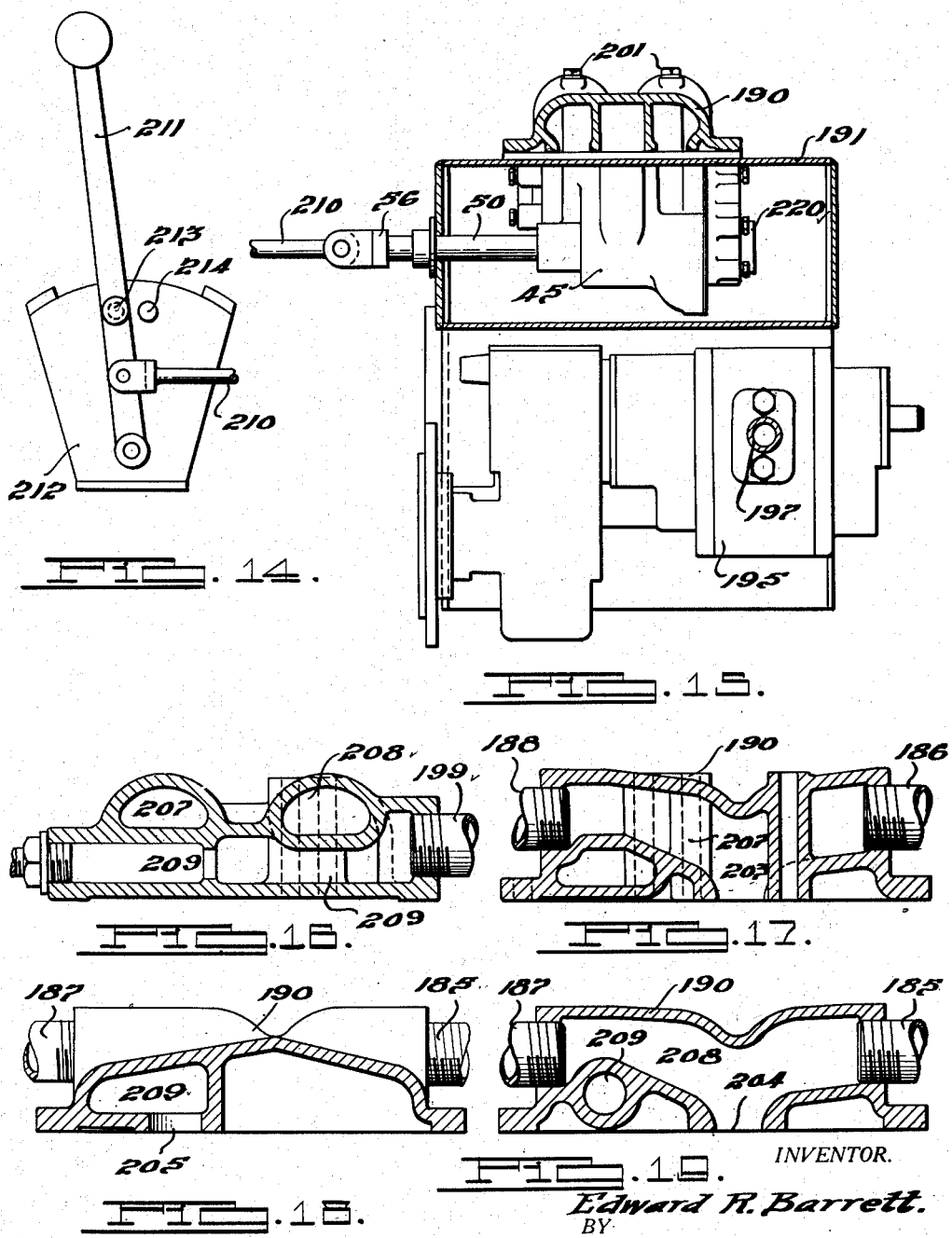

Patented June 11, 1940

2,203,938

UNITED STATES PATENT OFFICE 2,203,938

FLUID CONTROL SYSTEM

Edward R. Barrett, Detroit, Mich., assignor to Gar Wood Industries, Inc., a corporation of Michigan Application August 24, 1936, Serial No. 97,489

3 Claims. (Cl. 121—46.5)

The present invention relates primarily to fluid control systems. More particularly, it relates to a specific form of fluid control system primarily adapted for actuating hydraulic mechanism controlling a conventional type of road scraper or bulldozer.

While it will be apparent from the following description that the broad inventive concept disclosed in this application will find broad and practical utility in many other installations than the specific form of the invention disclosed, it will be appreciated that many features of the present invention find peculiar utility and particular adaptability in the specific embodiment disclosed in the drawings.

The present invention contemplates the provision of a self-contained scraper unit particularly adaptable for grading of roads, scraping of surfaces and movement of earth, or other material. The present invention contemplates the installation of auxiliary means upon a conventional tractor or other motor power unit to make such unit particularly adaptable for the purposes desired.

The present invention has for a general object the provision of novel hydraulic control means for regulating the position of the scraper unit with respect to the tractor unit on which it is mounted.

The present invention further contemplates the provision of novel hydraulic means for positioning the scraper with respect to the tractor and of novel means for controlling the supply of fluid pressure to the hydraulic means in order that the position to which the scraper element is adjusted may be accurately and conveniently controlled by the operator of the tractor unit.

It has long been appreciated that in fluid supply systems such as are utilized for the purpose of controlling the supply of fluid pressure to a hydraulic actuating cylinder, it is virtually essential to utilize poppet type or other effective sealing valves for preventing return of fluid from the cylinder after it has once been pumped thereinto. Consequently, the present invention contemplates the provision of novel valve structure wherein sliding or piston type valves are utilized for the purpose of actually distributing the fluid to the various cylinders as may be required and poppet valves operate in combination with the piston valves in order to provide an effective seal and prevent return of fluid from the cylinder even under excessively high loads. It will be appreciated that the utilization of the sliding type of valve provides a system in which the valves are accurately balanced and consequently, susceptible of convenient manual control. It will likewise be appreciated that the utilization of the poppet valves in combination with a valve system of this type renders the highly desirable tight sealing effect obtainable in combination with the ease of operation provided by the sliding type control valves.

It is a still further object of the present invention to provide a construction in which the manually controlled sliding valves which serve to distribute fluid to the various cylinders as is desired, are so constructed and arranged that a balanced condition is at all times obtained and consequently, the manual effort required to operate the valves is in no way dependent upon the fluid pressure to which the valves are subjected.

Still further it is an object of the present invention to provide a relatively simple, rugged and effective fluid operated control mechanism for actuating a road scraper or bulldozer which may be easily and conveniently installed upon conventional tractor constructions, and the invention further contemplates the provision of mechanism which may be conveniently and easily mounted upon tractor constructions of many and various types such as are now in common use.

Further, the present invention contemplates the utilization of hydraulic cylinders for regulating the vertical position of the scraper element, which cylinders are of the double acting type, that is, fluid is disposed upon both sides of the actuating piston of each of the cylinders and means are provided for supplying fluid to the cylinders in such a manner that the cylinders are automatically bled from one side as fluid pressure is supplied to the opposite side of the piston therein. This construction results in a type of mounting in which the piston is at all times positively retained in a predetermined position within the cylinder due to the presence of fluid on both sides thereof and consequently, the resiliency of the fluid in the system as a whole tends to provide a positive, yet slightly resilient, mounting for the scraper construction and operates as a hydraulic shock absorber for positively positioning the scraper element with respect to the tractor on which it is mounted.

The present invention contemplates the provision of novel and effective distributing valves for supplying fluid pressure to the actuating cylinders of the mechanism and contemplates the provision of a valve construction which may be easily and conveniently controlled.

Yet another object of the present invention resides in a novel form of valve construction which may be positioned in such a way that the pump supplying fluid thereto serves to provide a pressure to open the poppet valves and permit relatively free bleeding from both sides of the system, thereby permitting the scraper blade to float and move freely up and down in accordance with the contour of the surface over which it passes.

Many other and further objects and advantages of the present invention will become clearly apparent from the following specification when considered in connection with the accompanying drawings forming a part thereof.

In the drawings:

Figure 1 illustrates in side elevation one embodiment of the invention showing the apparatus applied to a conventional caterpillar type of tractor with the power take-off mechanism at the forward end thereof.

Figure 2 illustrates in side elevation a modified form of the invention illustrating the control mechanism positioned adjacent the driver's seat of a tractor of the type in which the power take-off mechanism is located at the rear end thereof.

Figure 3 illustrates in plan a still further modified form of the invention in which the apparatus is shown as mounted upon a tractor and in which the control assembly is located at the rear end of the tractor mechanism.

Figure 4 is a side elevational view of the apparatus shown in Figure 3.

Figure 5 is an enlarged sectional view taken substantially on the line 5—5 of Figure 1 illustrating in detail the fluid control valve of the fluid distribution piston within its housing.

Figure 6 is a transverse sectional view taken substantially on the line 6—6 of Figure 5 illustrating in detail the valve unit in top plan.

Figure 7 is a transverse sectional view taken substantially on the line 7—7 of Figure 5 illustrating the valve unit in bottom plan.

Figure 8 is an enlarged sectional view taken substantially on the line 8—8 of Figure 6, illustrating in detail the interior construction of the valve for controlling the distribution of fluid pressure.

Figure 9 is a sectional view similar to Figure 8 illustrating the valve mechanism in a different position.

Figure 10 is a sectional view similar to Figures 8 and 9 illustrating the valve mechanism in a still different position.

Figure 11 is a fragmentary sectional view similar to Figures 8, 9 and 10 illustrating the valve parts in still a different position.

Figure 14 is an enlarged elevational view taken substantially on the line 14—14 of Figure 3 illustrating in detail the manually operated lever for controlling the fluid distribution valve shown in Figures 12 and 13.

Figure 15 is an enlarged vertical sectional view taken substantially on the line 15—15 of Figure 13 illustrating in detail the mounting of the modified form of fluid distributing system within the modified housing.

Figure 16 is a transverse sectional view taken substantially on the line 16—16 of Figure 12, illustrating in detail the interior construction of a portion of the distribution manifold secured to the top of the valve housing.

Figure 17 is a transverse sectional view taken substantially on the line 17—17 of Figure 12, illustrating in further detail the interior construction of the fluid distributing manifold.

Figure 18 is a sectional view taken substantially on the line 18—18 of Figure 12, illustrating in further detail the interior construction of the fluid distributing manifold.

Figure 19 is a sectional view taken substantially on the line 19—19 of Figure 12, illustrating in still further detail portions of the interior construction of the fluid distributing manifold.

Figure 12:
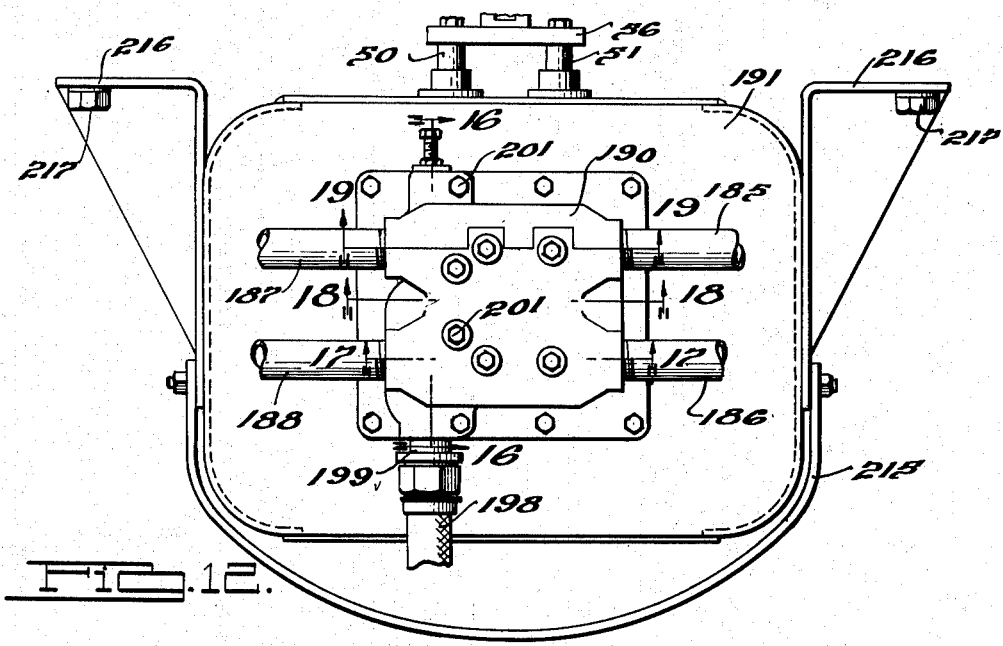
Figure 12 is an enlarged top plan view illustrating the fluid distribution unit shown in the modified form of apparatus illustrated in Figures 3 and 4.

With more particular reference to the drawings, it will be easily understood that the generic inventive principles set forth in this application will, upon slight and immaterial modification, find wide and practical utility in many and various other installations of a similar nature. However, in order to make the generic invention taught clearly apparent, the present application relates to a rather specific embodiment of the invention which is merely illustrative of the broad principles disclosed.

The apparatus disclosed in Figure 1 shows a type of installation particularly adaptable for tractors in which the power take-off mechanism is located at the forward end of the tractor unit. Consequently, it is necessary to provide an installation in which the fluid distribution system is located adjacent this portion of the tractor unit in order that the pump mechanism forming an essential part of the fluid distribution system may be conveniently driven by this power take-off mechanism.

The tractor to which the apparatus is applied is shown in dotted lines as it forms no part of the present invention and is merely illustrated to show the manner in which the improved apparatus is installed in connection therewith. This tractor unit includes a motor unit 10 supported on and serving to drive a caterpillar drive mechanism 11 and adapted to be controlled in a conventional manner by a driver seated in a seat 12 at the rear end of the unit.

The scraper mechanism shown is of substantially conventional construction and comprises a working blade or scraper 15 extending transversely across the front of the vehicle and supported by means of a pair of longitudinally extending side frame members 16, each extending along the outboard side of the vehicle and pivotally secured thereto by means of a suitable universal pivot 17. It will be appreciated that this structure permits not only a relatively free vertical movement of the scraper 15 with respect to the surface over which it travels, but also permits a limited transverse movement thereof with respect to the vehicle on which it is mounted. A substantially triangular supporting bracket 18 is supported on the frame of the tractor unit by means of suitable braces 19 and it will be seen that this bracket 18 serves to provide a pivotal support for an actuating bell crank 20, which is pivotally mounted thereon at the point 21. As is conventional in constructions of this general character, one of the brackets 18 with bell crank 20 is located on each of the opposite sides of the vehicle and the forward ends of each of the bell cranks are adjustably connected to one of the side frame members 16 by means of an adjustable rod connection 23 adjustably secured at one end in the outer end of the bell crank 20 and pivotally connected to the side frame 16 at its lower end. Preferably a pair of lock nuts 24 are utilized for the purpose of adjusting this connection between the bell crank 20 and the side frame members 16 in order that the apparatus may conveniently be regulated for the particular use for which it may be intended.

The rear end of each of the bell crank arms 20 has a piston rod 25 pivotally connected thereto by means of a suitable pivot pin 26 and this piston rod 25 extends into a cylinder 27 through a suitable packing gland 28. The cylinder 27 is at its opposite end preferably pivotally mounted upon the bracket 18 in order that the axis of the cylinder may be shifted in accordance with the requirement of the bell crank arm which it serves to operate, and it will be easily appreciated that as pivotal movement of the bell crank arm 20 takes place about its pivot 21, a certain limited pivotal movement of the cylinder 27 will be required.

It will be appreciated by reference to Figure 1 that both ends of the cylinder 27 are closed and consequently introduction of fluid pressure into either end of the cylinder will serve to cause a pivotal movement of the bell crank arm 20 about its pivot and consequently the desired raising or lowering of the scraper blade with respect to the vehicle on which it is mounted.

A fluid distributing unit generally designated 30 is permanently secured to the forward end of the tractor and is described in detail below. As will hereinafter be more clearly seen, this fluid distribution system serves to supply liquid under pressure into either one of two conduits 31 and 32, which are connected thereto. The conduit 31 extends rearwardly and is connected to a T member 33, one branch of which has a flexible high pressure hose 34 having one end connected thereto and the opposite end connected into the lower end of the cylinder 27 to supply fluid thereto. The other branch of the T member 33 has a conduit 36 connected thereto, which extends around the rear of the driver seat 12 and serves to supply fluid to the lower end of the cylinder 27 on the opposite side of the tractor. The conduit 32 is connected to a similar T member 37, one branch of which serves to provide means for interconnecting a flexible conduit 38 for supplying fluid to the upper end of the cylinder 27, and it will be seen that the other branch of the T member 37 serves to provide means for connecting a conduit 39, which extends parallel to the conduit 36 around the rear of the driver's seat 12 and serves to supply fluid to the upper end of the cylinder 27 located on the opposite side of the tractor.

From the foregoing it will be easily appreciated that as fluid pressure is supplied by means of the distribution unit 30 to the conduit 31, this fluid under pressure will be simultaneously transmitted to the lower ends of the cylinders 27 on both sides of the tractor and consequently cause an upward movement of the piston rod 25 and a simultaneous pivotal movement of the bell cranks 20 about their pivots 21, thus forcing the scraper blade 15 downwardly. When the supply of fluid pressure is reversed, as will be hereinafter described in greater detail, it will be seen that fluid pressure will be supplied through the conduit 32 and consequently, to the upper ends of the two cylinders 27, which will serve to raise the scraper 15 with respect to the surface over which the tractor travels.

The interior detail construction of the fluid distribution system serving to simultaneously actuate the cylinders 27 is illustrated in the enlarged detail views, Figures 5 to 11, inclusive, of the drawings. The fluid distributing unit shown comprises an enclosing housing 40, the bottom portion of which constitutes a reservoir 41, in which a suitable supply of liquid, preferably oil, is at all times maintained, for the purpose of providing fluid to actuate the system as a whole. A pump 42 of any suitable construction is connected to the power take-off at the forward end of the tractor and if desired, may have a suitable clutch mechanism for driving the same in order to provide for operation of the pump only at such times as may be desired, irrespective of the operation of the motor of the tractor. Such constructions are conventional in power take-off mechanisms now in common use, and inasmuch as the features thereof form no part of the present invention, the construction has not been illustrated in detail. The intake side of the pump 42 is connected to the reservoir 41 and the outlet side of the pump has connected thereto a suitable conduit 43, which is connected to a port 44 in a valve housing 45 enclosed and supported within the fluid distributing housing 40. The valve housing also is provided with a port 46, to which the conduit 32, described above, is connected, and a port 47 to which the conduit 31 is connected. From the foregoing, it will be seen that fluid from the reservoir 41 will be delivered by the pump to the valve housing 45 and as will hereinafter be clearly seen, this fluid is distributed within the valve housing 45 to be delivered either through the ports 46 and 47 or bled back into the reservoir 41, depending upon the particular manner in which it is desired to actuate the apparatus.

Due to the fact that the system as a whole is entirely closed, it will be appreciated that means must be provided within the valve housing structure for permitting the exhaust of fluid from each of the cylinders 27 as fluid is supplied thereto on the opposite side of the piston therein. Consequently, it is desirable to control the rate at which this bleeding of the cylinders takes place at a rate exactly in accordance with the rate at which fluid is pumped into the respective cylinders.

The valves utilized for controlling the distribution of the fluid within the valve housing 45 are of the plunger type and include a pair of plungers 50 and 51 extending through substantially parallel cylindrical bores 52 and 53, respectively, in the housing 45. The plungers 50 and 51 are rigidly interconnected at their upper ends by means of a bar 56 to which is rigidly connected a vertically extending operating rod 57 mounted for vertical reciprocation in a suitable bearing 58 and extending out of the enclosing housing 40. The operating rod 57 is adapted for vertical reciprocation by means of a bell crank 59, which is pivotally supported by a pair of links 60, and it will be seen by reference to Figure 5 that one arm of the bell crank is pivotally connected to the upper end of the actuating rod 57 and the other arm of the bell crank extends upwardly to form a manual actuating handle 61. In the particular form of the apparatus shown in Figure 1 of the drawings, it is apparent that the actuating handle 61 is not easily accessible from the driver's seat 12 of the tractor, and consequently, it is necessary to provide remote control means for actuating this handle. The particular type of remote control means disclosed comprises a longitudinally extending actuating rod 65, which is pivotally connected to an actuating lever 66, pivotally supported on a fixed support 67 adjacent the driver's seat 12 of the tractor. It will be appreciated that this arrangement permits easy and accurate control of the actuating rod 57 from the driver's seat of the tractor on which the apparatus is mounted. The plunger valve 50 is of sufficient diameter to be slidably received within the bore 52 and is reduced in diameter throughout certain portions of its axial length to permit communication between certain of the ports which communicate with the bore 52. As will be clear by reference to Figures 8 to 11, inclusive, of the drawings, the fluid may be supplied from the pump 42, and fed into the conduit 43 and port 44 into the valve housing 45, and thence into a chamber 70, which annularly surrounds the bore 52. A fluid distributing chamber 71 is formed in substantially the central portion of the housing, and it will be seen that this chamber 71 communicates with a pair of chambers 72 and 73, which are located below and above the chamber 70 in substantially equally spaced distances therefrom, and each of which also opens into the bore 52. The valve member 50 is provided with a reduced portion 75 of sufficient axial length to bridge the space and establish communication between the adjacent chambers 70 and 73. Below this reduced diameter portion, the plunger valve 50 is bored out to provide an axially extending passageway 76, which, at its upper end, is provided with a plurality of radially extending ports 77, which, when brought into registry with either the port 70 or 72, will provide communication between these chambers and the interior of the valve 50. Below the point in the valve 50 where the radially extending ports 77 open, the valve plunger is again reduced in diameter to provide a reduced diameter portion 80 of sufficient length to bridge the ports 72 and 70 and to provide communication therebetween. Spaced somewhat below the reduced diameter portion 80 is still another reduced diameter portion 82, the purpose and function of which will hereinafter become more clear. Immediately below the reduced diameter portion 82 are a plurality of radially extending outlet ports 83, and it will be seen that the lower end of the valve has secured thereto a cylindrical portion 84, which serves to close the end of the axial bore 76 and is of a diameter adapted to fit snugly within the bore 52.

From the foregoing, it will be appreciated that the bore 76, extending axially of the valve plunger 50, is completely closed except for radial ports 77 and 83.

Spaced a substantial distance below the annular port 72 is an outlet port 90, which communicates with an outlet conduit 91, from which fluid is permitted to drain back down into the reservoir 41, as will hereinafter become more clear.

The bore 53, which serves to receive the valve plunger 51, has three substantially equally spaced annular ports 95, 96 and 97, in communication therewith. The valve plunger 51 is of considerably smaller diameter throughout the majority of its length than the bore 53 in which it operates. However, it is provided with two spaced, enlarged portions 99 and 100. These enlarged portions 99 and 100 serve to fit closely within the bore 53 and serve to guide the valve plunger during vertical movement.

The port 46, which, as has been described above, serves as the means by which fluid is fed from the valve housing 45 into the conduit 32, opens into the interior of the valve housing into a chamber 105.

Immediately beneath the chamber 105 is a chamber 106, which communicates with the annular port 95 surrounding the bore 53. Communication between the chambers 105 and 106 is provided through a circular port having a removably mounted valve seat 107 therein. A poppet valve 108 cooperates with the valve seat 107 to control communication between the chambers 105 and 106. The poppet valve 108 preferably has a cylindrical extension 109 formed on the upper surface thereof, which is adapted to fit in a suitable cylindrical recess formed in a cover plate 110, which serves to close the chamber 105. This cylindrical projection 109, fitting in this recess, serves to maintain the valve 108 at all times axially aligned with its valve seat 107 during reciprocation of the valve. The valve 108 is normally urged into engagement with its valve seat by means of a compression coil spring 111, one end of which abuts against the plate 110 and the opposite end against the upper surface of the valve 108. Beneath the compartment or chamber 106 is a distributing chamber 112, which is at all times in communication with the annular port 96 surrounding the bore 53. Communication between the chambers 106 and 112 and between the chamber 112 and 71 is established through a pair of cylindrical bores 114 and 115, respectively. These two bores are axially aligned with the valve seat 107 described above. The valve 108 has an axially extending stem 117 which is provided with a cylindrical pistonlike enlargement 118 adapted to be closely slidably received by the bores 114 and 115 and of a sufficient axial length to close both of these bores at the same time. The stem 117 of this valve extends on downwardly below the enlarged portion 118 and passes through a suitable bore into a chamber 120 which is at all times in communication with the port 47 to which the conduit 31 is connected, as has been described above. Outlet from the chamber 120 is obtained through a circular port having a circular valve seat 121 mounted therein, and it will be seen that communication may be had from the chamber 120 through the valve 121 into a chamber 122 which is at all times in communication with the annular ports 97 surrounding the bore 53. The valve seat 121 is concentrically arranged and axially aligned with the valve seat 107 and the bores 114 and 115. A valve 125 is permanently secured to the lower end of the valve stem 117 and cooperates with the valve seat 121 to control communication between the chamber 120 and the chamber 122.

The enlarged pistonlike valve member 118 on the valve stem 117 has an effective area substantially the same as the effective area of the valves 108 and 125, and, as will be seen hereinafter, this pistonlike member serves to balance these poppet valves and preclude fluid pressure in the system from unseating of these valves except at such times when desired.

The housing 45 as a whole is firmly seated upon a partition plate 130 which divides the upper portion of the outer housing 40 from the lower portion, which lower portion constitutes the reservoir 41. This plate serves to provide a closure for the lower opening in the chamber 122 beneath the valve seat 121 and it will be seen by reference to Figures 8 to 11, inclusive, that the plate 130 is provided with a suitable aperture 131 therein, which registers with the outlet opening 91 described above. It will be appreciated that the plate 130 is likewise provided with a drain opening 132, which permits fluid to drain from the upper portion of the housing 40 down into the reservoir 41.

The operation of the fluid distributing valve is substantially as follows: It is assumed that the motor in the tractor is running and is drivingly interconnected with the rotary pump 42 and that this pump is drawing oil from the reservoir 41 and pumping said oil up through the conduit 43 and into the valve housing through the port 44. The valve is shown in the neutral position in Figure 8. It is assumed that the scraper 15 is in an intermediate position such that the piston is disposed at some point intermediate the ends of the cylinder 27. Due to the weight of the scraper, a downward force will be exerted upon the longer arm of the bell crank and consequently, will exert an upward force on the piston rod 25, tending to force fluid through the conduit 38, which, as has been described above, is connected by means of the T fitting 37 to the conduit 32. It is therefore obvious that a substantial pressure will exist in the conduit 32, and inasmuch as this conduit opens into the chamber 105, this pressure will be exerted upon the upper surface of the poppet valve 108 and will serve, together with the resilient spring 111, to retain this poppet valve firmly seated on the seat 107 and consequently, will retain this valve tightly closed and virtually leak-proof. This poppet valve construction has been found to virtually preclude the possibility of seepage of fluid back through the system and consequently, once the scraper blade has been raised to the desired position, the source of power used for elevating it may be cut off and the scraper will be retained in elevated position almost indefinitely, due to the tight and effective closure of the valve 108 on its seat 107.

As the pump 42 continues to operate, it will be apparent that fluid will be fed inwardly through the port 44, which communicates with the annular port 70 surrounding the bore 52 in which the plunger valve 50 is reciprocably mounted. As the parts are shown in neutral position in Figure 8, it will be apparent that the fluid entering this port 70 will flow through the radially disposed ports 77 into the hollow interior of the plunger 50. It will be apparent that as long as the parts are retained in the position shown in Figure 8, the valve is so constructed and arranged that this fluid pressure will be cut off from the ports 72 and 73 and consequently its only line of escape is down through the hollow bore 76 in the valve 50 and it may escape outwardly through the radial ports 83 at the lower end of this bore into a chamber 140. While in some positions of the valve plunger 50 the chamber 140 is completely closed, it will be seen that when the plunger is in the position shown in Figure 8, the reduced diameter portion of the plunger 82 will bridge the portion of the bore between the chamber 140 and the annular port 90, consequently permitting fluid to flow upwardly from the chamber 140 and out of the annular port 90 into the outlet opening 91, which, as has been described above, serves to permit the fluid to drain back into the reservoir 41.

It will be apparent that as long as the plungers are retained in the position shown in Figure 8, all of the fluid pumped by the pump 42 will pass inwardly through the ports 44 into the chamber 70, inwardly through the radial ports 77 in the valve plunger 50, and downwardly through the hollow bore of this valve plunger, outwardly through the radial ports 83 into the chamber 140, and upwardly from the chamber 140 into the port 90 and downwardly through the outlet 91 back into the reservoir.

It is assumed that it is now desired to lower the scraper blade toward the surface over which the tractor travels. The actuating handle 66 is moved forwardly, causing a downward movement of the plungers 50 and 51 to substantially the position shown in Figure 9 of the drawings. When the parts are in this position, it will be seen that the pumped fluid will flow inwardly through the port 44, port 70 and, due to the reduced diameter portion 75 of the valve plunger 50, will be permitted to flow upwardly and out of the port 73 into the chamber 71. It will be seen that the parts have been now moved to a position where the outlet port 90 is closed by the plunger 50 and that the radial ports 77 are moved downwardly out of registry with the port 70 and consequently, these ports 77 are therefore also closed, precluding the entry of fluid thereto. Inasmuch as the chamber 71 is in communication with both of the annular ports 73 and 72, it will be apparent that a balanced pressure condition will obtain with respect to the valve 50, and the fluid pressure supplied by the pump will have no tendency whatsoever to move this valve. Due to the fact that all ports normally providing escape for the fluid from the chamber 71 are now closed, it will be seen that a substantial pressure will be built up in this chamber and that this pressure will be exerted on the underside of the pistonlike member 118 controlling communication through the port 115. Inasmuch as the plungers 50 and 51 are connected together and move in unison, it will be seen that the downward movement described above will move the plunger 51 into a position where the communication between the ports 96 and 97 will be established and communication between the ports 95 and 96 will be precluded. The pressure in the chamber 71 will increase until it is sufficient to move the pistonlike member upwardly, thus establishing communication between the chamber 71 and the distributing chamber 112, which, as has been described above, is constantly in communication with the port 96. It will be seen that fluid will now flow from the chamber 71 into the fluid distribution chamber 112 into the port 96 along the plunger 51, out of the annular port 97, into the chamber 122, through the valve seat 121 and out of the port 47.

Free flow through the valve seat 121 will be permitted inasmuch as the upward movement of the pistonlike member 118 has inherently caused a movement of the valve 125 from its seat. It will also be clear that inasmuch as the valve stem 117 has been moved upwardly with the pistonlike member 118, the valve 108 will be dislodged from its seat, and consequently fluid will be bled from the upper side of the piston 27, through the conduits 38 and 32, into the port 46, and downwardly through the valve seat 107 into the chamber 106, which, as has been described, is constantly in communication with the annular port 95 surrounding the bore 53. Inasmuch as the bore 53 is open at its upper end from the annular port 95, the fluid passing into this bore through this port may flow upwardly and out of the housing 45, from whence it will fall downwardly on to the floor plate 130 and may drain from this floor through the opening 132 into the reservoir 41. Due to the fact that both the valves 125 and 108 are simultaneously removed from their seats by movement of the pistonlike enlargement 118 on the valve stem 117, it will be clear that the rate at which fluid is bled from the upper end of the cylinder 27 will be roughly equivalent to the rate at which fluid is pumped into the lower end thereof and consequently, the system as a whole will be maintained completely filled with fluid at all times.

When it is desired to raise the scraper blade 15, the plungers 50 and 51 are simultaneously elevated to substantially the position shown in Figure 10. With the plungers arranged in this position, it will be apparent that fluid from the pump may flow inwardly through the port 44 into the annular port 70. It will be apparent that when the parts are in this condition, the reduced diameter portion 80 of the plunger 50 will serve to bridge the ports 70 and 72 and permit communication therebetween. Consequently, the fluid will flow from the port 70 into the port 72 and thence to the chamber 71. Inasmuch as the chamber 71, as has been described, is constantly in communication with the annular port 73, it will be apparent that again a balanced condition of the plunger 50 will obtain, and that equal pressures will be exerted thereon, thus precluding any tendency of the fluid pressure to move this element. The pressure in the chamber 71 will be built up sufficiently to move the pistonlike member 118 upwardly, consequently establishing communication between the chamber 71 and the fluid distribution chamber 112. Due to the fact that the plunger 51 has been simultaneously moved upwardly with the plunger 50, it will be seen that the enlarged diameter portion of this plunger 100 serves to preclude communication between the ports 96 and 97 and that the reduced diameter portion of the plunger has served to establish communication between the ports 95 and 96 and close the outlet of the port 95 which was used to bleed fluid from the housing when the parts were in the condition shown in Figure 9. It will therefore be apparent that fluid will flow from the chamber 71, through the bore 115, into the chamber 112, port 96, port 95, into the chamber 106 underneath the valve seat 107. Inasmuch as upward movement of the pistonlike member 118 has raised the valve 108 from its seat, the fluid will be permitted to flow upwardly through the valve seat 107 into the chamber 105, and outwardly through the port 46 into the conduit 32, which, as has been described above, connects with the upper ends of each of the cylinders. This fluid pressure will cause a downward movement of the pistons in the cylinders and consequently, serves to expel fluid from the lower ends of the cylinders, through the conduits 34 and 31, and force this fluid in through the port 47 into the chamber 120. Due to the fact that the valve 125 has been opened simultaneously and to the same degree as the valve 108, it will be apparent that this fluid will be permitted to flow through the valve seat 121 into the chamber 122, port 97, and outwardly through the lower end of the cylindrical bore 53, back into the reservoir, as has been described above.

It will be appreciated that in each of the conditions of the valve described above and shown in Figures 8, 9 and 10 of the drawings, the scraper blade controlled by the valve is either locked in position, or else is being moved upwardly or downwardly as may be desired. It has been found particularly essential in apparatus of this general character that means be provided whereby the scraper blade may float and be disposed into position where it is free to move up and down in accordance with the contour of the surface over which it travels. In order to establish such a condition it is virtually essential that the valve mechanism serving to supply fluid from the valve be adjustable to such a position that fluid may be freely bled from either side of the system in order that the pistons in the cylinders will be free to move in either direction. When the scraper blade is disposed in this position it will be seen that it may be driven over the ground and the mere weight of the apparatus serves to provide the downward pressure desired for some particular scraping operations.

In order to accomplish this result the valve plungers 50 and 51 are moved slightly downwardly from the position shown in Figure 8 to a point intermediate the position shown in Figure 8 and the position illustrated in Figure 9 which position is shown in Figure 11. When the parts are in this condition, it will be seen that the ports 77 providing communication with the interior of the valve plunger 50 will be substantially closed by the cylindrical wall of the housing in which this plunger is mounted. Communication will be established between the annular port 70 and the annular port 73 due to the disposition of the reduced diameter portion 75 of the valve plunger 50. Consequently, fluid supplied by the pump and fed inwardly through the port 44 will constantly be in communication with the chamber 71 and escape of such fluid will be precluded except through the port 115. It will be appreciated that this downward movement of valve plunger 50 produces a simultaneous downward movement of the valve plunger 51 sufficient to establish a slight opening between the enlarged portion 99 of the valve plunger 51 and its bore, consequently permitting escape of fluid from the chamber 106 to the exterior of the housing 45. Likewise the enlarged portion 100 of the valve 51 will be moved downwardly, but not sufficiently far to prevent escape of fluid from the chamber 122 out through the lower end of the bore 53. The pressure supplied by the pump will necessarily cause an upward movement of the pistonlike member 118 providing a consequent upward movement of the valves 108 and 125, thus permitting fluid to escape from either side of the piston, as may be desired. Due to the position of the valve plunger 51, it will be appreciated that the fluid escaping from either side of the piston in each of the cylinders may escape to the exterior of the housing 45 and be drained back into the reservoir from whence it was pumped, and that consequently, the scraper connected to these hydraulic pistons will be free to move upwardly and downwardly in accordance with the contour of the surface over which it travels. This position of the valve, it will therefore be seen, permits a floating of the scraper in which it is free to move upwardly and downwardly and is held in engagement with the surface over which it is traveling solely by means of its weight.

In Figure 2 is illustrated a modified form of the invention adapted for a type of tractor in which the power take-up mechanism is disposed at the rear portion thereof. In this form of the invention, the tractor comprises a motor power unit 140 which serves to drive caterpillar mechanism 141 and it will be appreciated that this tractor as a whole is adapted to be controlled by an operator seated in a seat 142 mounted adjacent the rear portion of the tractor structure. A suitable power take-off mechanism is provided adjacent the rear portion of the tractor and serves to drive a rotary fluid pump 143 which serves to take fluid from a reservoir 144 by means of a conduit 145 and supply this fluid under pressure through a conduit 146 to a fluid distributing valve 147 which is substantially identical with the fluid control valve mechanism 30 described in connection with the preferred embodiment of the invention and illustrated in Figures 1 to 11 of the drawings.

A scraper blade 150 is mounted on a pair of conventional side frame members 151 pivotally secured to the tractor frame at the rear portion thereof. A pair of vertical braces 152 jointly serve to support a trusslike member 153 which serves to provide a pivotal mounting for bell crank arms 154, the forward ends of which are connected to vertically disposed connecting rods 155 with the side frame members 151. The other arms of the bell cranks 154 are connected to the outer ends of the piston rods 156 extending within their cylinders 157 which are similar in construction to the cylinders 27 described above and are adapted to be supplied with fluid by means of a pair of conduits 158 and 159. The conduits 158 and 159 communicate respectively with conduits 160 and 161 which extend around the rear portion of the driver's seat and communicate with a cylinder on the opposite side of the vehicle in order that both of the side frame members 151 will be adapted for simultaneous actuation. The conduits 158 and 160 are each supplied with fluid by means of a conduit 163 which communicates with the distributor valve 147 and the conduits 159 and 161 are in communication with a conduit 164 also in communication with the distributor valve.

It will be appreciated that due to the disposition of the power take-off mechanism of the tractor unit described in connection with this embodiment of the invention, the control valve 147 may be located conveniently adjacent the driver's seat 142 and consequently, no remote control mechanism is necessary in order to provide for convenient actuation of the distributor valve by the driver of the tractor. As has been described above the control valve 147 is substantially identical in construction with the control valve 30 described above, and consequently the apparatus shown in this embodiment of the invention will inherently function substantially as has been described in connection with the preferred embodiment of the invention.

A still further modified form of the invention is illustrated in Figures 3, 4, and 12 to 19, inclusive, of the drawings. The particular embodiment of the invention illustrated in these figures is of the type particularly adaptable for a tractor unit in which the power take-off mechanism is located in substantially the rear central portion of the tractor. As is clearly seen in Figures 3 and 4, the tractor utilized in this embodiment of the invention includes the motor power unit 170 which serves to drive wheels 171, each pair of which may serve to carry an endless trackway or caterpillar belt 172. Rigid supports 173 disposed on each side of the tractor serve to provide means for supporting the scraper element. The scraper element includes a blade 175 which is carried by a suitable frame work generally designated as 176 including side frame members 177 which extend rearwardly and are pivotally mounted at 178 on suitable supports 179. The supports 179 are pivotally connected by means of suitable links 180 to the upper end of the rigid supports 173. The side frame members 177 are also interconnected with these suports by means of a hydraulic cylinder 181 and piston rod 182 disposed on each of the sides of the vehicle.

It will be readily appreciated from the foregoing that the piston and cylinder constructions 181 and 182, together with the mounting of the frame work 176 and scraper blade 175, serve to provide means by which the vertical position of the scraper blade 175 may be accurately regulated with respect to the tractor on which it is mounted by supplying fluid to the cylinders 181. Each of the cylinders 181 is provided with a conduit 183 connecting with the lower end thereof and a conduit 184 connecting with the upper end thereof. These conduits 183 and 184 are preferably flexible, in order to permit relative movement of the cylinder with respect to the tractor on which it is mounted. The conduits 183 and 184 on one side of the vehicle are connected by means of suitable fittings to permanently join them with the conduits 185 and 186, respectively, while the conduits 183 and 184 on the opposite side of the vehicle are connected similarly to conduits 187 and 188, respectively, and it will be seen that the ends of the conduits 185, 186, 187 and 188 all connect into a manifold 190 secured to the top of a housing 191 mounted on the rear of the tractor. The interior construction and detail operation of the manifold 190 is explained in greater detail below.

Figure 13:
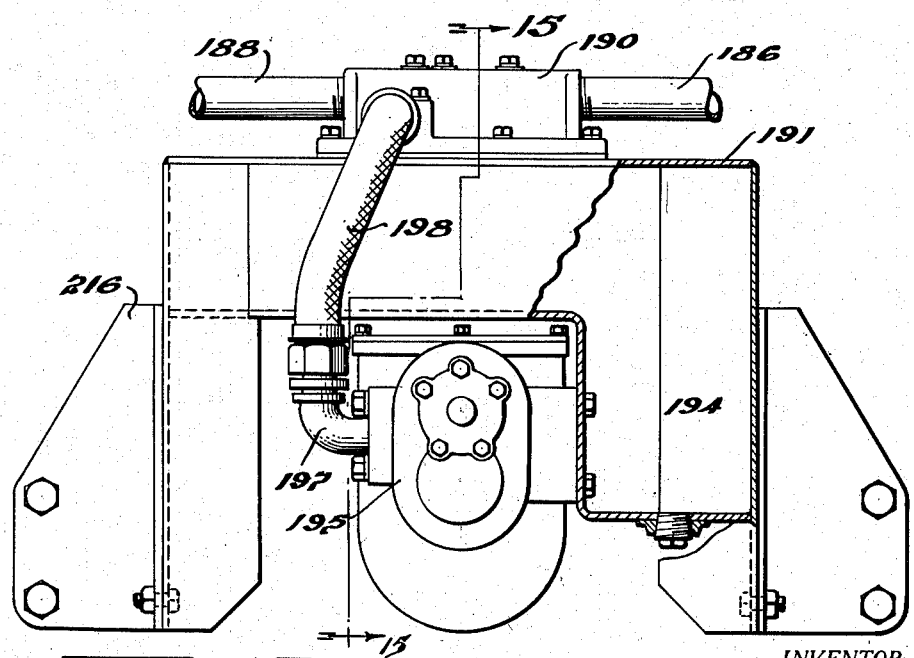
Figure 13 is a rear elevational view of the fluid distribution control unit illustrated in Figure 12.

The housing 191 is generally L-shaped in interior configuration, providing in the lower portion thereof a reservoir 194, clearly seen in Figure 13 of the drawings. Bolted in direct communication with the housing 191 in one of the side walls of the reservoir portion 194 thereof is a pump housing 195 which encloses a conventional pump of the rotary pipe adapted to be directly driven by a power take-off mechanism at the rear of the tractor. The pump is provided with an outlet connection 197, to which is secured a suitable conduit 198, the opposite end of which is connected to a port 199 in the manifold 190. A distributor valve 45, substantially identical with the valve shown in Figures 8 to 11 of the drawings, is secured to the top wall of the housing 191 on the under side thereof, and it will be seen that the manifold 190 may be bolted directly to this valve housing 45 through the top wall of the housing 191. It will be appreciated that the valve 45 is located in a horizontal position in this form of the invention rather than in the vertical position disclosed in connection with the preferred embodiment of the invention described above. Suitable bolts 201 extend through the manifold and serve to secure this manifold to the valve housing 45 and it is readily seen that the upper wall of the enclosing housing 191 is provided with apertures permitting communication to be established between the ports in the side wall of the valve housing 45 and the ports in the lower face of the minifold 190. The manifold 190 is provided in its lower face with a port 203 which is adapted to communicate with the port 46 in the distributor valve housing. Likewise the manifold is provided with a port 204 which is adapted to communicate with the port 47 in the valve housing, and a third port 205 adapted to communicate with the inlet port 44 of the distributor valve housing.

It will be seen by reference to Figure 17 that the conduits 186 and 188 open into a chamber 207 which is at all times in communication with the port 203 and consequently, in communication with the port 46 in the distributor valve housing. Likewise, the conduits 185 and 187 open into a chamber 208, which is in communication with the port 204 and consequently with the port 47.

The intake port 199 in the manifold 190 communicates with a chamber 209 interiorly of the manifold, which chamber is in communication with the port 205 and consequently serves to supply fluid under pressure to the distributor valve through the port 44 thereof.

It will be appreciated, due to the fact that the valve housing 45 is placed in horizontal position, the plungers 50 and 51, which serve to control communication to this valve, will be mounted for reciprocation horizontally. In order to operate these plungers conveniently from the driver's seat of the tractor, a horizontally disposed operating rod 210 is pivotally connected to the cross bar 56, which interconnects the plungers 50 and 51 for operation in unison. This operating rod 210 extends forwardly and is pivotally secured to a valve operating lever 211, which is pivotally mounted on a quadrant 212. The actuating lever 211 may be provided with a spring pressed ball assembly 213 adapted to seat in suitable notches 214 formed in the quadrant 212 in order that the position to which the valve is adjusted may be accurately controlled. Due to the perfectly balanced condition of the distributor valve shown in detail in Figures 8 to 11 of the drawings, it is often difficult for the operator to feel the actual position in which the valve is adjusted. Consequently, it is desirable to provide some sort of conventional means associated with the operating handle in order that the actual position of the valve may be accurately indicated.

The housing 191 is permanently secured to the rear end of the tractor by a suitable framework, generally designated as 215, which is provided with laterally extending flanges 216, through which may pass suitable bolts 217 for securing the unitary control assembly to the rear end of the tractor frame.

It will be appreciated that in this form of the invention, fluid may conveniently be pumped from the reservoir 194, conduit 198, to the manifold 190. As will be clear by reference to Figures 16 and 18, this fluid fed into the manifold will be fed into the inlet port 44 of the distributor valve. The distributor valve operates in substantially the manner described in connection with the preferred embodiment of the invention and it will be seen that fluid will simultaneously be fed to either the conduits 187 and 185 or 186 and 188, as may be desired, or that the valve as a whole may be adjusted in such a position that fluid will be bled from the conduits and the position of the scraper with respect to the surface over which it travels may accurately be adjusted and controlled, as may be desired.

It will be appreciated that inasmuch as the plate 130, which cooperates with the valve housing 45 in the preferred embodiment of the invention described above, is dispensed with in this form of the invention, it is essential that some means be provided for closing the opening in the housing 45 immediately beneath the poppet valve 125. A suitable closure, such for example as the plate 220, may be bolted to the housing 45 to tightly close this opening.

It will be appreciated that the function of the valve mechanism, illustrated in Figures 3, 4, and 12 to 19, is substantially the same as that described in the preferred embodiment of the invention discussed in detail above, while the structure shown is of particularly unique unitary construction adapted to be easily mounted upon a conventional tractor construction.

The above described embodiments of the invention are merely illustrative of the generic inventive concept presented. Many other and further modifications falling within the scope of the invention as defined in the subjoined claims will be clearly apparent to those skilled in the art.

I claim as my invention:

1. In a dual bore, fluid pressure piston valve, a housing having dual bores connected by a cross-over passage, a receiver piston valve in one of the bores constructed to normally receive and release fluid when in one position and to receive and direct the fluid to the cross-over passage when in another position to build up fluid pressure therein, a distributor piston valve in the other of the bores, means providing distributing passages in the housing, means for moving said valves in unison, said distributor piston valve being constructed to selectively direct fluid to and exhaust fluid from the distributing passages, a spring loaded plunger element movably disposed within said cross-over passage and movable in response to said build-up of fluid pressure therein to allow fluid to flow to said other of the bores, and a tappet valve in one of said distributing passages and connected to said plunger for movement therewith to control flow of fluid through said one of the distributing passages.

2. In a fluid pressure valve, a housing having parallel bores providing a receiving bore and a distributor bore, a receiving piston valve movably mounted in the receiving bore, a distributor piston valve movably mounted in the distributor bore, means for moving said valves in unison, a gated cross-over passage connecting said bores, said passage including a pressure build-up pocket, a gate valve mounted within said cross-over passage between said pocket and said distributor bore, means resiliently urging said gate valve against the fluid pressure in said build-up pocket, said gate valve being movable by the build-up of pressure in said pocket, a pair of passages connecting the distributor bore with a pair of openings in the housing, said openings becoming inlets or outlets depending on the position of the distributor piston valve in its bore, tappet valve closure means in said last named passages normally covering both of said openings, means connecting said tappet valve closure means with said gate valve for transmitting movement to said tappet valve closure means upon movement of said gate valve for unseating said tappet valve closure means to admit or discharge incoming and outgoing fluid in said last named passages.

3. In a fluid pressure valve mechanism, a housing divided into first and second spaced sets of chambers, each of said sets including a number of adjacent chambers, a pair of substantially parallel bores formed in said housing in spaced relation to each other, one of said bores communicating the chambers of said first set with each other and the other of said bores communicating the chambers of said second set with each other, a pair of valve plungers movably disposed within said bores, means connecting said plungers together for movement in unison, said plungers being constructed with portions which engage the walls of said bores and with reduced portions so that when said plungers are in one position certain of said chambers of said sets are in communication with each other and when in another position other of said chambers of said sets are in communication with each other, means connecting one of the chambers of said first set with the exterior of the housing, means providing a fluid inlet through said housing communicating with another chamber of said first set, another means connecting certain of the chambers of said second with the exterior of the housing, means forming a cross-over passage communicating said sets of chambers with each other, means forming a third set of chambers within said housing, means communicating certain of said chambers of said third set with distribution ports formed in said housing, means connecting certain of the chambers of the third set with certain of the chambers of the second set, and means controlling the flow of fluid through the cross-over passage, said last named means including a spring loaded, slidable, sealing plunger movably disposed within said cross-over passage and movable in response to the fluid pressure in said cross-over passage, a tappet valve controlling flow through one of said distribution ports and fixedly secured to said slidable element for movement therewith so that fluid may pass through one of said distribution ports when the plungers are in one position, the construction being such that fluid returns through the other of said distribution ports and discharges from said housing through said another means.

EDWARD R. BARRETT